United States Patent [19]

Nambu

[11] 3,853,104
[45] Dec. 10, 1974

[54] SYSTEM FOR VAPORIZING AIR-FUEL MIXTURE SUPPLIED TO CYLINDERS OF AN INTERNAL COMBUSTION ENGINE FOR A MOTOR VEHICLE

[75] Inventor: Shyuya Nambu, Yokohama, Japan

[73] Assignee: Nissan Motors Company, Limited, Yokohama City, Japan

[22] Filed: Feb. 6, 1973

[21] Appl. No.: 330,069

[30] Foreign Application Priority Data
Feb. 7, 1972  Japan.............................. 47-13870

[52] U.S. Cl. .... 123/122 H, 123/122 R, 123/122 AC
[51] Int. Cl. ........................................... F02m 31/00
[58] Field of Search.... 123/122 R, 122 AB, 122 AC

[56] References Cited
UNITED STATES PATENTS

| | | | |
|---|---|---|---|
| 1,351,396 | 8/1920 | Midgley | 123/148 DS |
| 2,239,480 | 10/1941 | Morris | 123/122 AB |
| 2,367,023 | 1/1945 | Horton | 123/148 DS |
| 2,651,507 | 9/1953 | Heeneike | 123/122 AB |
| 2,876,754 | 3/1959 | O'Bernaier | 123/117 A |
| 3,441,008 | 4/1969 | Nelson | 123/122 AB |
| 3,625,190 | 12/1971 | Boissenain | 123/122 AC |

FOREIGN PATENTS OR APPLICATIONS

| | | | |
|---|---|---|---|
| 1,576,445 | 6/1970 | Germany | 123/122 R |
| 353,882 | 7/1931 | Great Britain | 123/122 AB |

*Primary Examiner*—Charles J. Myhre
*Assistant Examiner*—R. H. Lazarus

[57] ABSTRACT

Herein disclosed is an improved system for vaporizing air-fuel mixture applied to an internal combustion engine. The system according to the present invention comprises a modified ignition system or a modified exhaust valve lifter cam control for progressively raising the temperature of exhaust gases discharged from some cylinders but not all cylinders of the engine. The exhaust gases the temperature of which has been raised are exploited to vaporize the fuel of the mixture when the engine is cold for shortening the warm-up period of the engine under cold weather conditions.

2 Claims, 6 Drawing Figures

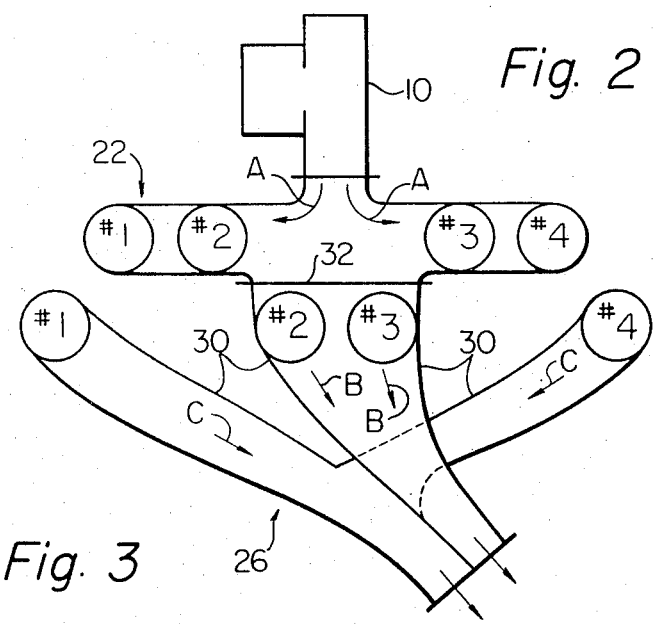
Fig. 2
Fig. 3
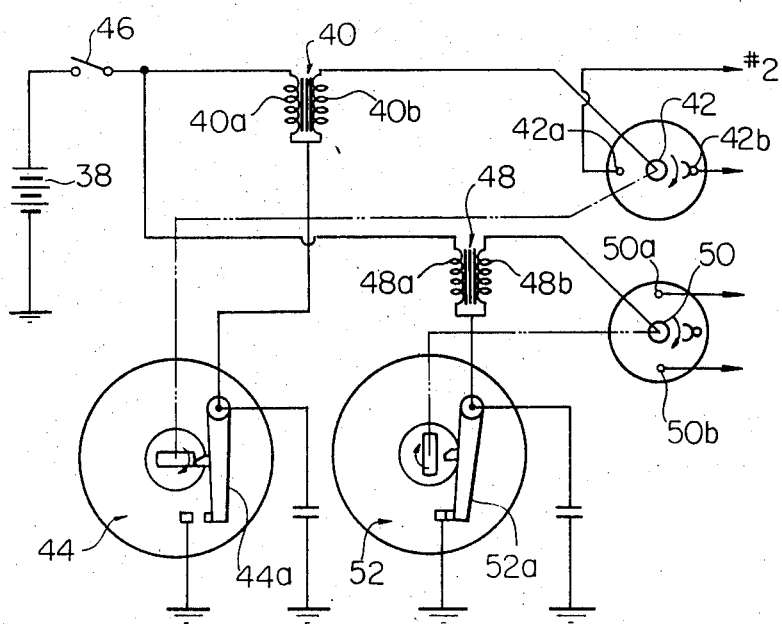

SYSTEM FOR VAPORIZING AIR-FUEL MIXTURE SUPPLIED TO CYLINDERS OF AN INTERNAL COMBUSTION ENGINE FOR A MOTOR VEHICLE

The present invention relates to a system for vaporizing the fuel of air-fuel mixtures supplied to the cylinders of an internal combustion engine for a motor vehicle.

Motor fuels for various types of internal combustion engines sometimes contain heavier, less easily vaporized constituents. Consequently, more attention has to be given, not only to atomization, but also to the subsequent vaporization. Without the special means now employed to ensure the latter process, the fuel would condense on the walls of the intake manifold, and give erratic engine running, more especially under cold weather conditions. It has been found that such fuel is ordinarily deposited in greater part where the mixture changes its path, namely, at angles and bends of the intake manifold.

It is therefore usual to provide heat to the mixture to ensure vaporization. This may be done by locally heating part of the intake manifold by the exhaust.

Where exhaust gas is used to heat the mixture to ensure vaporization, a problem is encountered in that the vaporization of the fuel can not be ensured when the engine is idling after it has been started and during its subsequent operation under cold weather conditions, with the result that a righ air-fuel mixture is necessary to operate the engine under such weather conditions. This will increase hydrocarbon and carbon monoxide concentrations in the exhaust gas because hydrocarbon and carbon monoxide concentrations in the exhaust gas depend upon the air-fuel ratio of the mixture and there is an increasing tendency as the mixture becomes rich to emit larger amounts of these air pollutants. Thus, it has been the drawback of the prior art internal combustion engine that the hydrocarbon and carbon monoxide concentrations in the exhaust gas are unduly high during idling and the subsequent operation of the engine after the engine has been started under cold weather conditions.

For suppressing the emission of hydrocarbons and carbon monoxide from the engine into the atmosphere it has been proposed to install a catalytic converter and/or a thermal reactor in the exhaust system of the engine. Generally speaking, catalytic converters and thermal reactors work well to reduce the emission of hydrocarbons and carbonmonoxide only after they have reached their reaction temperature or have been warmed up. However, it takes a considerable length of time until they have warmed up when the engine is idling and during its subsequent operations after it has been started under cold weather conditions, because the temperature of the exhaust gas emitted from the engine is not high enough to vaporize the mixture nor sufficient for the thermal reactors or the catalytic converter to operate. Hence the emission of hydrocarbons and carbon monoxide into the atmosphere can not be reduced by this known method satisfactorily.

Accordingly one object of the present invention is to provide means to reduce hydrocarbon and carbon monoxide concentrations in the exhaust gas when the engine is idling and during the subsequent low speed operation after the engine has been started under cold weather conditions by progressively heating the combustible mixture to ensure vaporization of the fuel of the mixture supplied to the engine.

Another object of the present invention is to provide a method and a system for vaporizing the mixture supplied to the cylinders of the engine, which system can effectively or progressively vaporize the mixture once the engine has been started under cold weather conditions. Thus the engine can run with a relatively lean mixture, suppressing the emission of hydrocarbons and carbon monoxide from the engine because there is a decreasing tendency to form these contaminants as the mixture is weakened from rich to lean.

The above objects can be achieved by a system having an intake manifold communicating with a mixture supply means, such as a carburettor, and communicable with cylinders via their respective intake valves for distributing the mixture to the cylinders, an exhasut manifold having a first set of exhaust branch passages communicable with predetermined cylinders selected from the cylinders via their respective exhaust valves and a second set of exhaust branch passages communicable with the remaining cylinders via their respective exhaust vales, means for conducting heat from exhaust gases flowing through the first set of exhaust branch passages to the mixture within the intake manifold when the engine is running within a predetermined operating range, and means for raising the temperature of the exhaust gases flowing through the first set of exhaust branch passages.

Other objects and advantages will become apparent from the following detailed description taken in conjunction with the accompanying drawings, in which:

FIG. 2 is a schematic plan view showing the arrangement of a carburettor, an intake manifold and an exhaust manifold shown in FIG. 1.

FIG. 3 is a diagrammatic view showing an ignition system according to one embodiment of the present invention and used with the intake manifold and the exahsut manifold shown in FIGS. 1 and 2.

Figure 1:
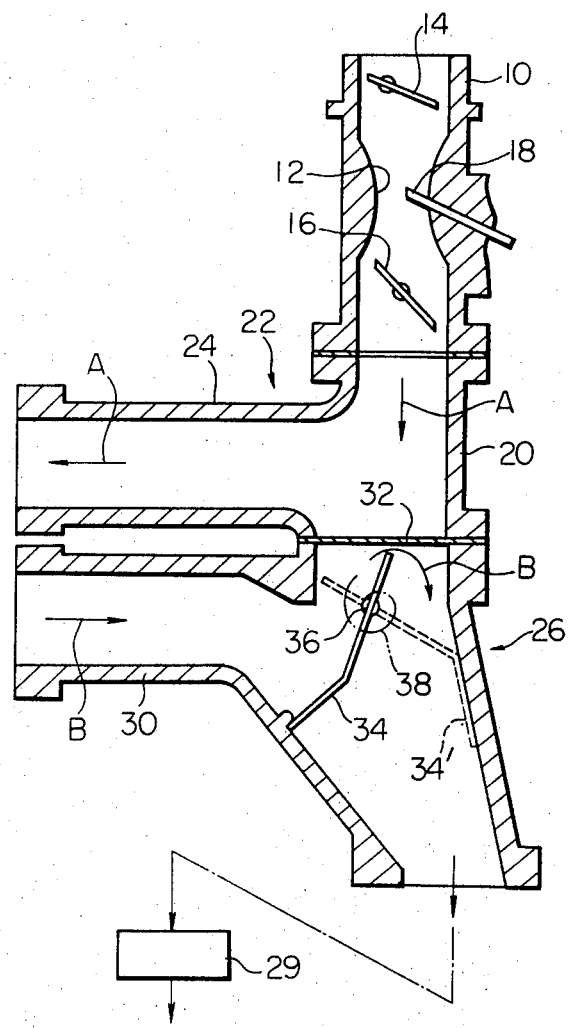
FIG. 1 is a sectional partially diagrammatic view of an internal combustion engine to which the present invention is applied.

While the present invention may, with slight modifications, be adapted for employment with engines having varying numbers of cylinders, it is for purposes of disclosure only described and shown herein as adapted for use in a four-cylinder engine. It is to be noted however, that the invention is not to be limited to the embodiments shown but is to cover all modifications and alternations falling within the scope of the invention as defined by the appended claims.

As above stated, the invention is herein shown as embodied for use with a four-cylinder engine. Intake ports for the cylinders are diagrammatically shown in the drawings and numbered consecutively from 1 to 4 to correspond with the usual numbering of the cylinders. Exhaust ports for the cylinders are numbered 1' to 4' to correspond with the usual numbering of the cylinders. For simplicity of illustration the cylinders of the engine are not shown in the drawings, but it is to be noted in the following description, that the cylinders are referred to by the reference numerals of their respective intake ports.

In FIGS. 1 to 3 there is diagrammatically shown intake and exhaust manifolds and an ignition system of a four-cylinder four cycle internal combustion engine according to one embodiment of the present invention. Another embodiment of the invention is shown diagrammatically in FIGS. 1, 2 and 6.

Referring to the drawings, and particularly to FIGS. 1 and 2, a barrel 10 of a typical downdraught carburettor has a throat or venturi 12, a choke valve 14 disposed upstream of the venturi, a throttle valve 16 downstream of the venturi and a main jet 18 open into the venturi, in conventional manner. The barrel is communicably secured to a bank or riser 20 of an intake manifold generally indicated by the reference numeral 22.

The intake manifold shown here is for a "downdraught type carburettor." Extending from the riser 20 are four intake branch passages 24 leading to the intake ports 1 to 4, respectively through their respective intake valves (not shown). Arrows A shown the mixture flow direction effected in the intake manifold 22. It is to be noted here that the mixture changes the direction of its path at a junction of the riser and the branch passages and thus the fuel will condense at the bottom of the riser right below the exhaust of the barrel 10.

An exhaust manifold generally indicated by the reference numeral 26 is shown in a partially direct contact with the bottom of the riser 20. As best seen in FIG. 2 the exhaust manifold has four branch passages 30 leading from the exhaust ports 1' to 4', respectively through their respective exhaust valves (not shown). Arrows B show the flow direction of the exhaust gases discharged from cylinders 2 and 3 while arrows C show the flow direction of exhaust gases discharged from cylinders 1 and 4.

In order to vaporize the fuel which may condense on the bottom of the riser by the heat conducted by the exhaust manifold, once the engine has been started under cold weather conditions to warm up and thereafter, or when the engine is running at low speeds, there is provided means for conducting the heat of the exhaust gases (arrows B) discharged from the exhaust ports 2' and 3' to the mixture flow in the intake manifold 22 once the engine has been started under cold weather conditions and thereafter when the engine is running at low speeds under such conditions. This means will be described hereinafter. It comprises a plate 32 and a thermostat operated valve 34.

The plate 32, which is made of a metal plate, for instance a copper plate, 0.3 – 3.0 mm thick, is disposed at the bottom of the riser 20 at the portion where the fuel will condense when the mixture is too rich. As shown in FIG. 1 the side of the plate 32 remote from the barrel 10 is exposed to the interior of the exhaust manifold 26.

The thermostat operated valve 34 is mounted on a spindle 36 which is connected to a spiral-shaped thermostat 38. The thermostat operated valve 34 is provided within the exhaust manifold 26 and arranged to regulate the amount of exhaust gas B directed to ward the plate 32 to heat the latter. It gives the maximum heating effect when in the "Heat-on" position (shown in a solid line) and the exhaust gases discharged from the engine cylinders 2 and 3 are directed against the plate 32. It gives the minimum heating effect when in the position "Heat-off" (shown in a dotted line) and the exhaust gas is not directed against the plate 32. The thermostat valve 34 is offset, or longer on one side of the spindle 36 than on the other. This allows exhaust gas pressure to force the valve 3 to assume its Heat-off position once the engine has commenced to run at full throttle.

It is to be noted in the foregoing that the plate 32 may be made of brass, steel or aluminum as the case may be. The effeciency of the heat conduction can be increased as the thickness of the plate 32 is reduced.

According to the present invention the exhaust gases from the engine cylinders 2 and 3 are utilized to heat the plate 32. For this purpose the arrangement of the plate 32 and the thermostat valve 34 is such that the exhaust gases discharged from the engine cylinders 2 and 3 are primarily directed against the plate 32 when the valve assumes the Heat-on position.

FIG. 1 also shows an exhaust cleaner 29, such as a catalytic converter, provided or installed downstream of the exhaust manifold 26 for the purpose of reducing the amounts of hydrocarbons and carbon monoxide discharged from the exhaust manifold 26 before the exhaust gas is emitted into the atmospheric air. As will be understood as the discussion proceeds the temperature of the exhaust gas B is increased and is sufficiently high even under cold weather conditions, once the engine has been started, and thus the time taken to also warm-up the catalytic converter can be shortened.

Referring now to FIG. 3 an ignition system according to the present invention has a DC power source 38, an ignition coil 40, a distributor rotor 42, an ignition distributor 44 incorporating a centrifugal and a vacuum advance mechanism (not shown) in the conventional manner, electric contacts 42a and 42b, spark plugs (not shown) for the cylinders 2 and 3 and connecting wiring. The ignition coil 40 has a primary winding 40a and a secondary winding 40b. The primary winding 40a is connected at one terminal with the DC power source 38 through an ignition switch 46. The secondary winding 40b is connected at one terminal with the distributor rotor 42. The ignition distributor rotor 44 has an interruptor 44a which is connected with the other terminals of the primary and thd secondary windings of the ignition coil 40 and which is arranged to provide retarded ignition timings when the engine speed (rpm) is below a predetermined level as will be described hereinafter. The rotor 42 is selectively operatively connected to the contacts 42a and 42b disposed thereabout. The ignition system shown in FIG. 3 also has another ignition coil 48, another distributor rotor 50, another ignition distributor 52 incorporating a centrifugal and a vacuum advance mechanism (not shown) in the conventional manner, electric contacts 50a and 50b, spark plugs (not shown) for the cylinders 1 and 4 and connecting wiring. The ignition coil 48 has a primary winding 48a and a secondary winding 48b. The primary winding 48a is connected at one terminal with the DC power source 38 through the ignition switch 46. The secondary winding 48b is connected at one terminal with the distributor rotor 50. The ignition distributor 52 has an interruptor 52a which is connected with the other terminals of the pimary and secondary windings of the ignition coil 48 and which is arranged to provide normal ignition timings. The rotor 50 is selectively operatively connected to the contacts 50a and 50b disposed thereabout.

Figure 4:
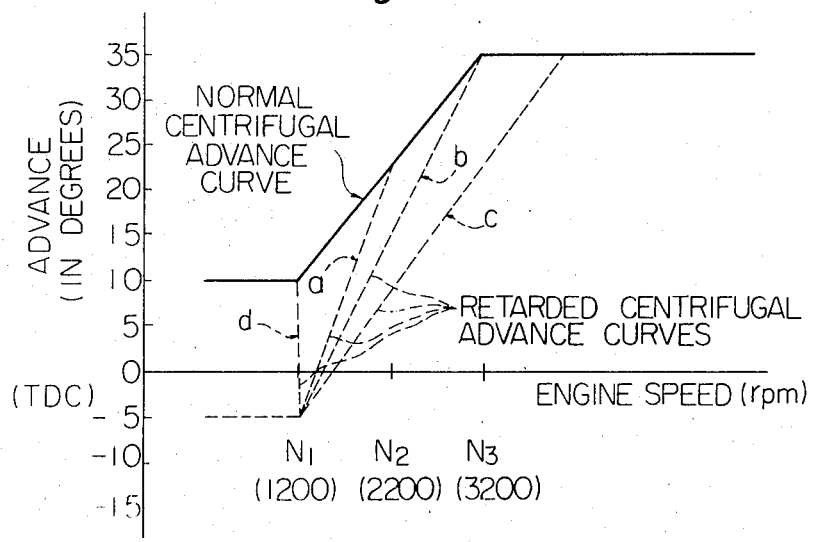
FIG. 4 is a chart showing a normal centrifugal advance curve and various modified centrifugal advance curves which can be provided by the ignition system shown in FIG. 3.
Figure 5:
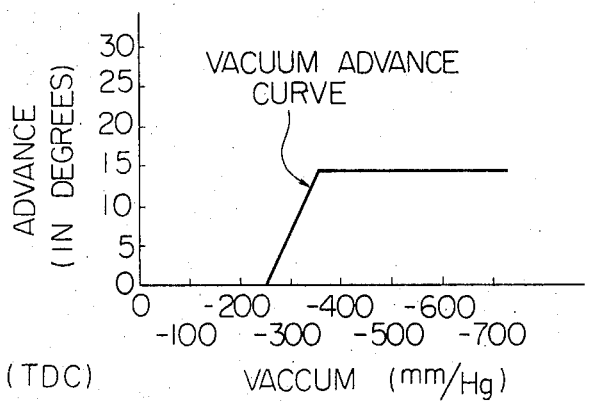
FIG. 5 is a chart showing a normal vacuum advance curve.

FIG. 4 shows a normal centrifugal advance curve (shown in a solid line) and a modified or retarded centrifugal advance curve (curve a), provided by the ignition distributors 44 and 52, respectively. FIG. 5 shows a vacuum advance curve provided by the ignition distributors 44 and 52 of the ignition system shown in FIG. 3.

At any particular engine speed there will be a definite amount of spark advance resulting from the operation of the centrifugal advance mechanism and also from the vacuum advance curve with respect to each of the ignition distributors 44 and 52.

It is to be noted that the vacuum advance is zero when the intake vacuum falls within the range between 0 and −250 mm/Hg and thus the ignition timing provided to all the cylinders 1 to 4 is determined only by the normal centrifugal advance curve and the retarded centrifugal advance curve when the engine is idling or operating at low speeds, or at full load. Therefore modifying the centrifugal advance mechanism of the ignition distributor 44 will cause the ignition system shown in FIG. 3 to provide retarded ignition timing to the cylinders 2 and 3 when the engine is idling or operating at low speeds.

Retarded ignition timing provided to the cylinders at idling or during subsequent low speed operation will necessarily cause reduction in combustion or in thermal efficiency of the cylinders 2 and 3, but it will result in a progressive raise in temperature of the exhaust gases discharged from the cylinders 2 and 3 flowing through the associated exhaust branch passages. The thus heated exhaust gases will progressively heat the plate 32 when the thermostat operated valve 34 assumes the Heat-on position and subsecuently they may readily warm up the exhaust cleaner 29 within a short period after the engine has been started. It will be appreciated here that raising the temperature of the exhaust gases by the ignition system as shown in FIG. 3 results in effective vaporization of the fuel in the intake manifold and thus regular running of the engine will lean mixture under cold weather conditions and the subsequent low speed operation can be attained.

When the engine speed is above $N_2$ (FIG. 4) it is not necessary to retard the ignition timing of the cylinders 2 and 3 because the exhaust gases discharged from the cylinders are raised high enough in temperature to heat the plate 32. Thus the centrifugal advance curve a is merging with the normal centrifugal advance curve above the engine speed $N_2$.

It is to be noted in the chart shown in FIG. 4 that the symbols $N_1$, $N_2$, and $N_3$ represent engine speeds, where $N_1$=1,200rpm, $N_2$=2,200rpm and $N_3$=3,200rpm for the engine described.

The centrifugal curves b, c and d are other modified curves which may be provided by the ignition distributor 52 of the ignition system as the case may be, if the present invention is adapted to various characteristics of the exhaust systems of various engines or different kinds of engines.

Although discussion has been directed to the modification of the ignition system for raising the exhaust gases of the cylinders 2 and 3 of the four-cylinder engine, another method or means will be proposed hereinafter for achieving the same purpose without modifying the conventional ignition system installed in the engine.

Figure 6:
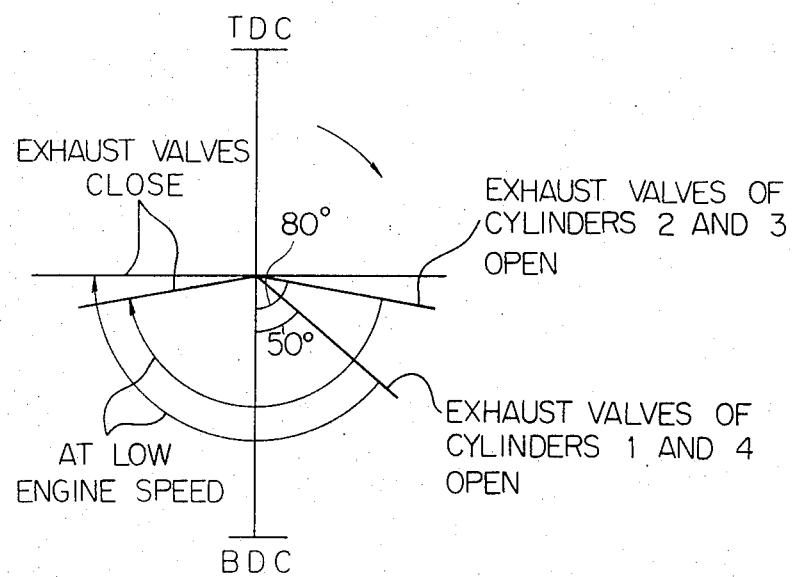
FIG. 6 is a diagrammatic view showing valve opening timings of the exhaust valves according to another embodiment of the present invention.

According to another modification of the present invention it is proposed to advance the timing of the valve opening of the exhaust valves of the cylinders 2 and 3, while the other exhaust valves of the cylinders 1 and 4 are controlled to open at the correct instant. If the exhaust valves of the cylinders 1 and 4 open at 50° (crankshaft angle) before BDC, it is preferable that the exhaust valves of the cylinders 2 and 3 should open 70° to 90° before BDC, as shown in FIG. 6. Advancing the valve opening timing of the exhaust valves of the cylinders 2 and 3 will result in that the exhaust gases discharged from the cylinders 2 and 3 are progressively raised in temperature. Thus progressive heating of the plate 32 can be achieved by this method.

It has been found that there is a reduction in the engine performance by advancing the timing of the exhaust valve opening of the cylinders 2 and 3 during all engine running conditions, but such reduction is not substantially significant because the timing of the valve opening of only selected exhaust valves is advanced, but not of all.

It is appreciated that progressively raising the temperature of the exhaust gases discharged from the cylinders 2 and 3 will result in the regular running of the engine under cold weather conditions and may help to warm up the exhaust gas cleaner 29 within a short period after the engine has started, with the result that a reduction in carbon monoxide or hydrocarbon concentrations in the exhaust gases can be attained by this method.

Advancing the timing of the valve opening of the exhaust valves of the cylinders 2 and 3 can be achieved without any difficulty by altering the dwell angles of the exhaust cams associated with the exhaust valves of the cylinders 2 and 3 or altering the profiles of such exhaust cams.

In the foregoing the present invention has been discussed as applied to the downdraught type carburettor but it is to be noted that the present invention can be applied also to other types of carburettors.

It is also to be noted that although the ignition system of the invention shown in FIG. 3 is in the form of a circuit diagram of a coil ignition system embodying the present invention for the purpose of retarding the ignition timing of some cylinders of the engine, an electronic ignition system can be used for the same purpose.

It is to be appreciated that according to the present invention effective vaporization of the air-fuel mixture supplied to the engine can be accomplished without considerably sacrificing the engine performance under cold weather conditions and regular running of the engine with lean mixture under such weather conditions can be attained, resulting in the reduction of hydrocarbon and carbon monoxide concentrations in the exhaust gases.

What is claimed is:

1. A system for vaporizing air-fuel mixtures supplied to cylinders of an internal combustion engine for a motor vehicle, the internal combustion engine having means for supplying the air-fuel mixtures, each of the cylinders being provided with an intake valve and an exhaust valve, which system cmprises,
   an intake manifold communicating with said air-fuel mixture supply means and communicable with said cylinders via said intake valves for distributing said mixtures to said cylinders, an exhaust manifold havibg a first set of exhaust branch passages communicable with predetermined cylinders selected from said cylinders via the exhaust valves thereof and a second set of exhaust branch passages communicable with the remaining cylinders via the exhaust valves thereof, said first and second sets of exhaust branch passages being communicable with the atmospheric air, means for raising the temperature of the exhaust gases flowing through said first set of exhaust branch passages and comprising a first means for providing normal ignition timing to said remaining cylinders and a second means for providing retarded ignition timing to said predetermined cylinders when said engine is running below a predetermined speed, said first means including a DC power source, a first ignition coil having a primary winding and a secondary winding, said primary winding being connected at one terminal thereof with said DC power source and said secondary winding being connected at one terminal thereof selectively with the ignition plugs of said remaining cylinders and a first ignition distributor having an interruptor connected to the other terminals of said first and secondary windings, said first ignition distributor being arranged to provide normal ignition timing, and said second means including a second ignition coil having a primary winding and a secondary winding, said primary winding of said second ignition coil being connected at one terminal thereof with said DC power source and said secondary winding of said second ignition coil being connected at one terminal thereof selectively with ignition plugs of said predetermined cylinders and a second ignition distributor having an interruptor being connected to the other terminals of said first and secondary windings of said second ignition coil, said second ignition distributor being arranged to provide retarded ignition timing when said engine is running below said predetermined speed and to provide normal ignition timing when said engine is running above said predetermined speed.

2. A system as claimed in claim 1, wherein said temperature raising means further comprises:

first set of exhaust cams providing normal timing for opening the exhaust valves of said remaining cylinders and a second set of exhaust cams providing advanced timing for opening the exhaust valves of said predetermined cylinders.

* * * * *